(12) United States Patent
Goto

(10) Patent No.: US 6,222,576 B1
(45) Date of Patent: Apr. 24, 2001

(54) THERMAL PRINTER

(75) Inventor: Satoru Goto, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/422,118

(22) Filed: Oct. 20, 1999

(30) Foreign Application Priority Data

Oct. 21, 1998 (JP) ................................................. 10-299997

(51) Int. Cl.[7] ................................................. G01D 15/28
(52) U.S. Cl. ................................................. 347/218
(58) Field of Search ................................. 347/218, 219; 400/662, 648; B41J 13/10, 13/14, 13/16

(56) References Cited

U.S. PATENT DOCUMENTS

| | | | |
|---|---|---|---|
| 6,078,345 | * | 6/2000 | Yamakawa et al. ................. 347/218 |
| 6,089,487 | * | 7/2000 | Imai et al. ........................ 242/348.4 |

FOREIGN PATENT DOCUMENTS 10-217518   8/1998   (JP) ................................ B41J/2/325

* cited by examiner

*Primary Examiner*—N. Le
*Assistant Examiner*—K. Feggins
(74) *Attorney, Agent, or Firm*—Sughrue, Mion, Zinn, Macpeak & Seas, PLLC

(57) ABSTRACT

A guide member is disposed between a thermal head and a conveyor roller pair. The guide member projects into a conveyance passage of a recording paper when a platen roller is separated from the thermal head. In this state, the guide member abuts on the recording paper having been forwarded by the conveyor roller pair. Further, the guide member guides the recording paper to feed it between the platen roller and the thermal head. When the platen roller is pressed against the thermal head, the guide member is pushed by support plates of the platen roller. The pushed guide member is lowered so that the guide member is evacuated from the conveyance passage of the recording paper.

13 Claims, 6 Drawing Sheets

THERMAL PRINTER

BACKGROUND OF THE INVENTION

1. Field of the Invention

The present invention relates to a thermal printer, and more particularly to a thermal printer in which a recording paper is fed between a thermal head and a platen.

2. Description of the Related Art

There is a color thermal printer in which a color thermosensitive recording paper is used to obtain a full-color print. The color thermosensitive recording paper has a plurality of thermosensitive coloring layers stacked on a support member. Thermal recording is performed for the respective thermosensitive coloring layers of the recording paper by means of a thermal head in a frame sequential manner. In such a color thermal printer, a color thermosensitive recording paper is fed between a thermal head and a platen, and one of the thermal head and the platen is moved toward the other thereof to nip the recording paper. After that, thermal recording is performed for the recording paper by heating the thermal head.

Japanese Patent Laid-Open Publication No. 10-217518 discloses a color thermal printer of which size is reduced by projecting a part of a color thermosensitive recording paper to the outside of the printer at the time of printing. In this color thermal printer, a recording face of the recording paper is adapted to be directed downward so that a thermosensitive coloring layer of the recording paper is prevented from being fixed by the ambient light. For this, a thermal head is disposed under a conveyance passage of the recording paper. Further, a platen facing the thermal head and nipping the recording paper is disposed above the thermal head.

In conventional color thermal printers, if a color thermosensitive recording paper has a curling peculiarity, the recording paper abuts on a thermal head or a platen when the recording paper is fed between the thermal head and the platen. Thus, there arises a problem in that the recording paper is not properly forwarded between the thermal head and the platen. In a color thermal printer having a thermal head disposed under a conveyance passage, an upper face of the thermal head is provided with a heating element array comprising a plurality of heating elements. Due to this, jamming of the recording paper sometimes occurs because a leading edge of the recording paper forwarded between the thermal head and the platen is caught by the upper face of the thermal head. Otherwise, as to a seal-like color thermosensitive recording paper, a recording paper is peeled from a separation paper so that defect of printing, failure in conveyance and so forth are caused.

The above-mentioned problems may be solved by disposing a roll, which acts as feeding means for conveying the recording paper, at a position being higher than the thermal head. However, when the roller is disposed at the higher position than the thermal head, an abutting condition of the recording paper and the heating element array becomes worse. Therefore, there arises a problem in that a print image becomes unclear.

SUMMARY OF THE INVENTION

In view of the foregoing, it is a primary object of the present invention to provide a thermal printer in which a recording paper is properly fed between a thermal head and a platen.

It is a second object of the present invention to provide a thermal printer in which a leading edge of a recording paper is not damaged.

It is a third object of the present invention to provide a thermal printer in which jamming and failure conveyance of a recording paper are prevented from occurring.

In order to achieve the above and other objects, the thermal printer according to the present invention comprises a guide member disposed between a thermal head and a paper feeding member.

The guide member is movable between a guide position where the guide member projects into a conveyance passage of a recording paper, and an evacuation position where the guide member is evacuated from the conveyance passage of the recording paper. When the recording paper is fed, the guide member is set at the guide position to properly forward the recording paper between the thermal head and a platen. When the recording paper is nipped by the thermal head and the platen, the guide member is set at the evacuation position.

The guide member is moved between the guide position and the evacuation position in association with operations in that the recording paper is nipped by the thermal head and the platen, and in that the recording paper is released from being nipped.

The guide member is urged by a spring toward the guide position. When the recording paper is nipped by the thermal head and the platen, the guide member is pushed and moved to the evacuation position against the urging force of the spring. When the recording paper is released from being nipped, pushing the guide member is taken away so that the guide member is moved to the guide position by the urging force of the spring.

The guide member has a plate-like shape or is constituted of a rotatable roller. In the case of the plate-shaped guide member, the guide member is integrally formed with the spring by using a plastic having elasticity.

Nipping the recording paper with the thermal head and the platen is performed after the guide member has been moved to the evacuation position.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
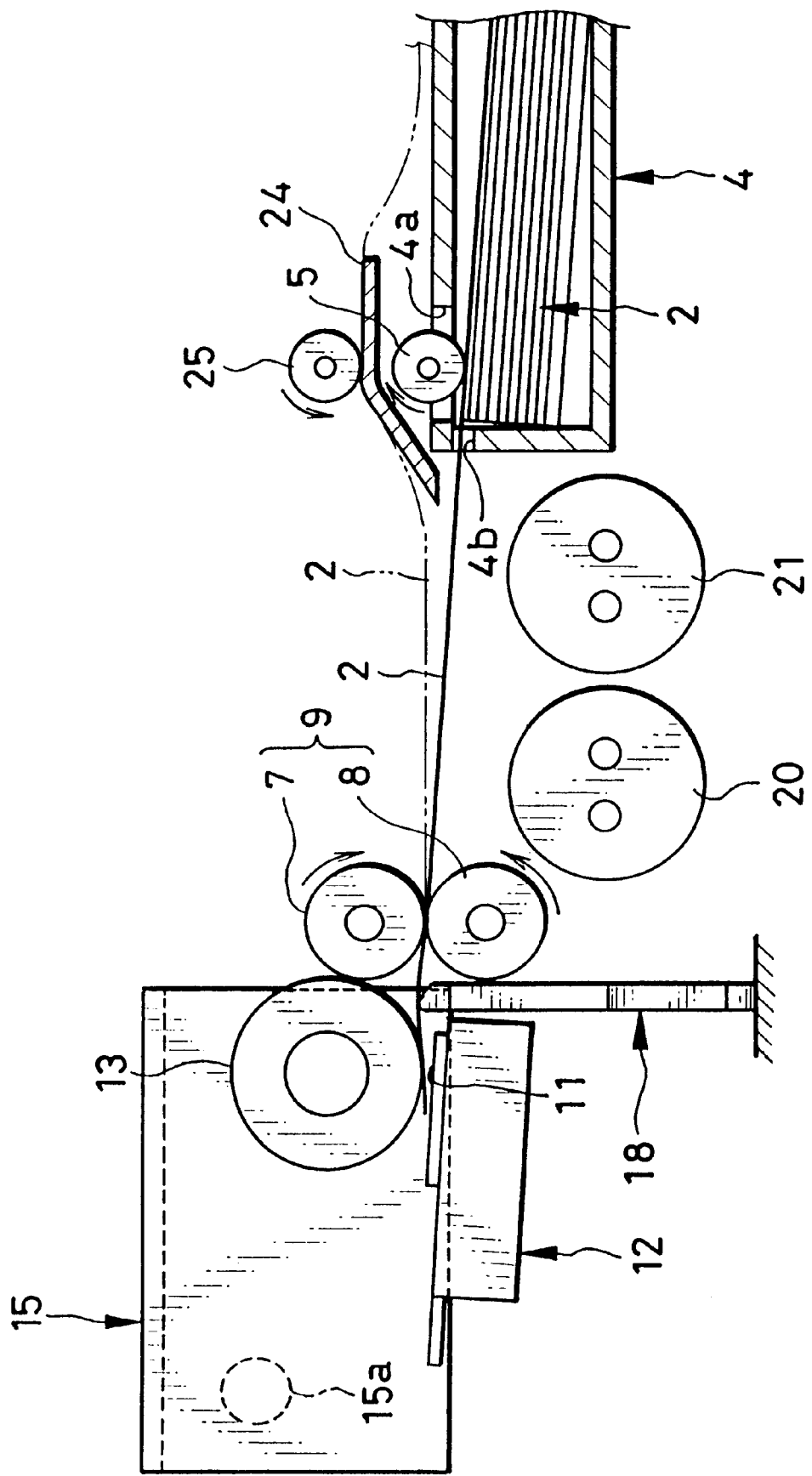
FIG. 1 is a schematic illustration showing structure of a color thermal printer according to the present invention.

FIG. 1 schematically shows a color thermal printer according to the present invention. In this color thermal printer, a color thermosensitive recording paper 2 having a sheet-like shape is used as a recording paper on which an image is thermally recorded. As well known, the color thermosensitive recording paper 2 comprises a cyan thermosensitive coloring layer, a magenta thermosensitive coloring layer, and a yellow thermosensitive coloring layer which are formed on a support member in order. The yellow thermosensitive coloring layer being the uppermost layer has the highest heat sensitivity so that it is colored in yellow by smaller heat energy. The cyan thermosensitive coloring layer being the lowermost layer has the lowest heat sensitivity so that it is colored in cyan by larger heat energy. Moreover, the yellow thermosensitive coloring layer loses its coloring ability when the near ultraviolet rays of 420 nm are applied. The magenta thermosensitive coloring layer is colored in magenta by heat energy which is intermediate heat energy relative to the yellow and cyan thermosensitive coloring layers. The magenta thermosensitive coloring layer loses its coloring ability when the ultraviolet lays of 365 nm are applied.

The recording papers 2 are contained in a paper cassette 4 in a state that a recording face thereof is directed downward. The paper cassette 4 is made of a plastic having a light-shielding property. An upper portion of the paper cassette 4 is provided with a paper feeding roller 5 which enters an opening 4a formed in an upper face of the paper cassette 4 and which abuts on the uppermost recording paper 2. The paper feeding roller 5 is rotated in a clockwise direction in the drawing. Thereby, the uppermost recording paper 4 is advanced from an outlet 4b formed in a front face of the paper cassette 4 toward a conveyance passage of the recording paper 2 provided in a printer.

At a downstream side of the conveyance passage of the recording paper 2, is disposed a conveyor roller pair 9 comprising a capstan roller 7 and a pinch roller 8. This pinch roller 8 is movable between a pressing position where the pinch roller 8 is pressed against the capstan roller 7, and a separating position where the pinch roller 8 is separated from the capstan roller 7. The conveyor roller pair 9 nips the recording paper 2 advanced by the paper feeding roller 5 to reciprocate the recording paper 2 in a paper feeding direction and a printing direction. The paper feeding direction is a direction in which the recording paper 2 is drawn out of the paper cassette 4. The printing direction is a direction in which the recording paper 2 is conveyed toward an upside of the paper cassette 4.

At a downstream side of the conveyor roller pair 9 relative to the paper feeding direction, a thermal head 12 is disposed. The thermal head 12 is provided with a heating element array 11 comprising a plurality of heating elements. The thermal head 12 is disposed under the conveyance passage and is fixed to the printer. The heating element array 11 is provided on an upper surface of the thermal head 12 to perform thermal recording for the recording paper 2 which is conveyed in a state that the recording face is directed downward. A platen roller 13 is disposed at a position facing the thermal head 12 so as to catch the conveyor passage between them. The platen roller 13 nips the recording paper 2 with the thermal head 12.

Figure 2:
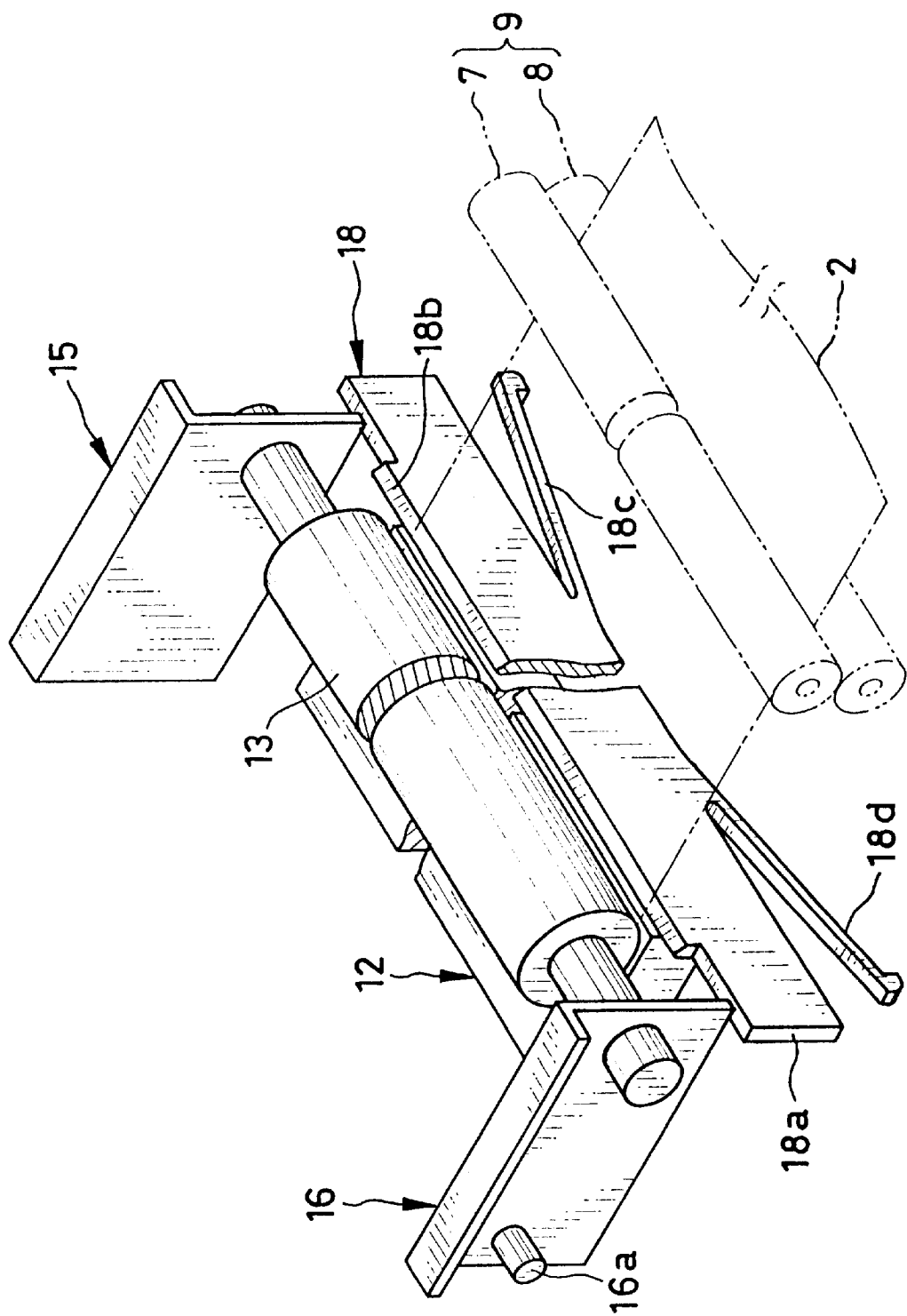
FIG. 2 is a perspective view showing a shape and arrangement of a guide member.

As shown in FIG. 2, the platen roller 13 is rotatably supported by a pair of support plates 15 and 16. These support plates 15 and 16 are swingable by means of pins 15a (FIG. 1) and 16a projecting from side faces thereof. The support plates 15a and 16a are swung by a cam mechanism, which is not shown, between a printing position and a paper feeding position. When the support plates 15a and 16a are set at the printing position, the platen roller 13 is pressed against the thermal head 12. When the support plates 15a and 16a are set at the paper feeding position, a gap is formed between the platen roller 13 and the thermal head 12.

Figure 3:
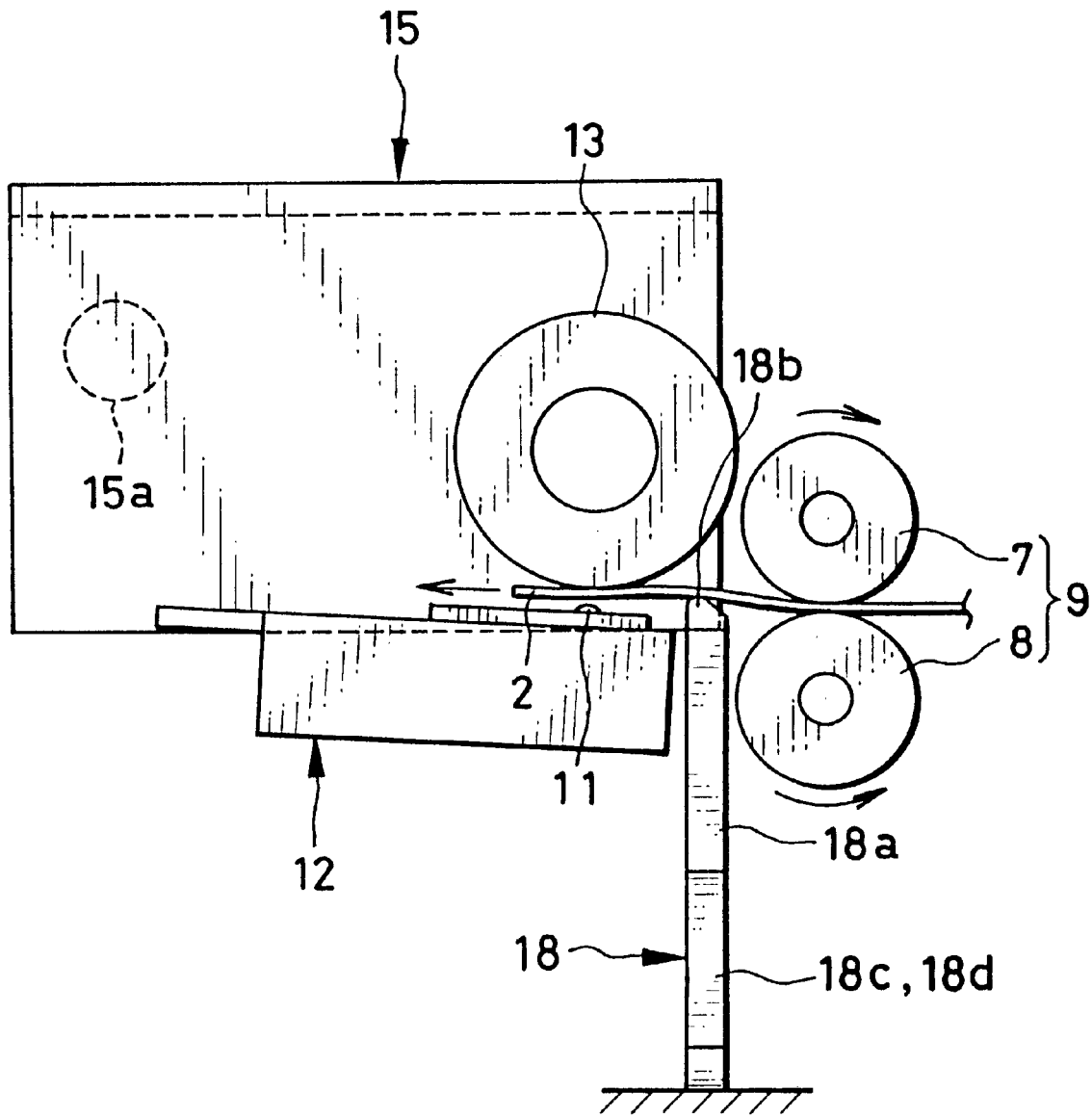
FIG. 3 is an explanatory illustration showing a state of the guide member at the time of paper feeding.
Figure 4:
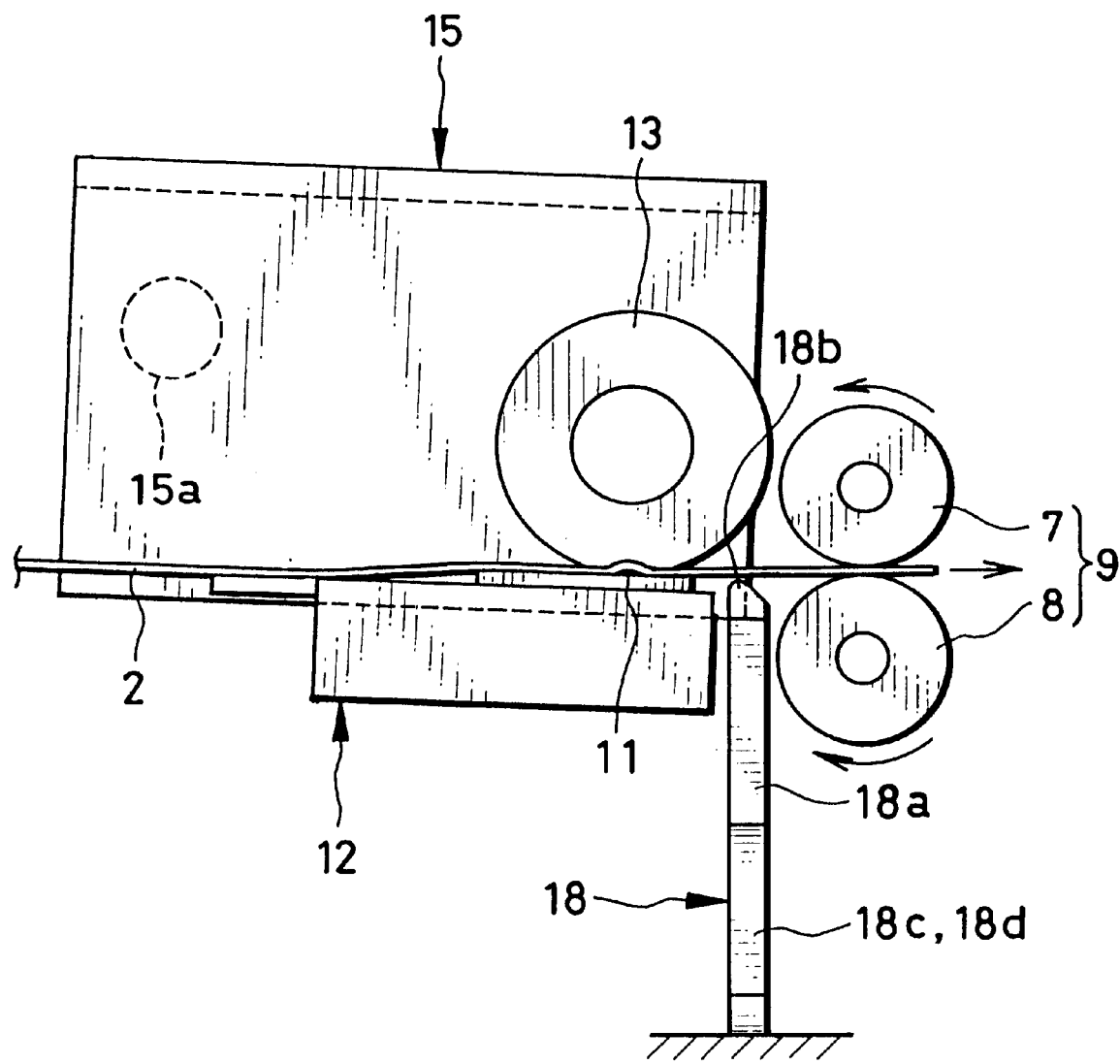
FIG. 4 is an explanatory illustration showing a state of the guide member at the time of printing.

Incidentally, in FIGS. 1, 3 and 4, the support plate 16 is omitted in order to avoid complication of the drawings.

The conveyor roller pair 9 has another function such as to receive the recording paper 2 having been conveyed by the paper feeding roller 5 and to forward it between the platen roller 13 and the thermal head 12 which are set at the paper feeding position. The thermal head 12 heats the heating element array 11 at a predetermined temperature to color the respective thermosensitive coloring layers of the recording paper 2 when the recording paper 2 is conveyed in the printing direction by the conveyor roller pair 9. When the platen roller 13 is set at the printing position, the platen roller 13 is rotated in accordance with the conveyance of the recording paper 2.

Between the conveyor roller pair 9 and the thermal head 12, a guide member 18 having a plate shape is disposed. The guide member 18 comprises a base portion 18a, a guide portion 18b, and a pair of elastic pieces 18c and 18d which are integrally made of a plastic having elasticity. The base portion 18a is formed along an axis direction of the platen roller 13. The guide portion 18b is provided on a top edge of the base portion 18a and has a slope. The elastic pieces 18c and 18d are springs provided on a bottom edge of the base portion 18a. The guide member 18a is movable in a direction being perpendicular to the conveyance passage of the recording paper 2, or in a vertical direction of the printer. The elastic pieces 18c and 18d abut on the bottom face of the printer so that the guide member 18 is urged upward.

As shown in FIG. 3, when the platen roller 13 is set at the paper feeding position, the guide member 18 is moved upward by the elastic pieces 18c and 18d. At this time, the guide member 18 is set at a guide position where the guide portion 18b projects into the conveyance passage of the recording paper 2. The guide portion 18b abuts on the recording paper 2 having been conveyed by the conveyor roller pair 9 in the paper feeding direction, and then, the recording paper 2 is forwarded between the thermal head 12 and the platen roller 13. The guide portion 18b is slanted so that the recording paper 2 is easily forwarded between the thermal head 12 and the platen roller 13. Further, the guide portion 18b is made smooth so as not to damage the edge of the recording paper 2.

In a conventional printer, when the leading edge of the recording paper has a curling peculiarity, sometimes the recording paper is not properly forwarded between the thermal head 12 and the platen roller 13. Especially, as to a printer having the thermal head disposed under the conveyance passage, sometimes the leading edge of the recording paper is caught by unevenness of the upper surface of the thermal head 12 and is damaged. Further, sometimes a seal-like recording paper is peeled from a separation paper so that failure in conveyance is caused. However, the guide member 18 according to the present invention guides the recording paper 12 to properly forward it between the thermal head 12 and the platen roller 13. Thus, the above-mentioned problems may be surely solved.

When the support plates 15 and 16 are swung to move the platen roller 13 to the printing position, the base portion 18a is pushed by bottom edges of the support plates 15 and 16. Thus, the guide member 18 is lowered against the urging force of the elastic pieces 18c and 18d, and is moved to an evacuation position where the guide portion 18b is evacuated from the conveyance passage. Due to this, when the recording paper 2 is printed, the conveyance of the recording paper 2 is not affected by the guide member 18 so that a quality of print is not deteriorated by the guide member 18.

Incidentally, as to operations in that the guide member 18 is moved from the guide position to the evacuation position and in that the platen roller 13 nips the recording paper 2 with the thermal head 12, the platen roller 13 is pressed against the thermal head 12 after the guide member 18 has been moved from the guide position to the evacuation position. Since such operation timing is adopted, the recording paper 2 is put between the platen roller 13 and the thermal head 12 in a state that the recording paper 2 comes into contact with the guide member 18. Accordingly, slack of the recording paper 2 is prevented from occurring between the conveyor roller pair 9 and the thermal head 12.

As shown in FIG. 1, a yellow ultraviolet lamp 20 and a magenta ultraviolet lamp 21 are disposed under the conveyance passage and between the paper cassette 4 and the conveyor roller pair 9 so as to face the recording paper 2. The yellow ultraviolet lamp 20 radiates the near ultraviolet rays of which luminous peak is 420 nm. The magenta ultraviolet lamp 21 radiates the ultraviolet rays of which luminous peak is 365 nm. The ultraviolet lamps 20 and 21 fix the yellow and magenta thermosensitive coloring layers of the recording paper 2 so that these coloring layers are not colored after fixation even if heat is applied thereto.

Above the paper feeding roller 5, are disposed a paper guide 24 and a paper discharging roller 25. The upper surface of the paper cassette 4 is also used as a paper tray on which the printed recording paper 2 is placed. The printed recording paper 2 is discharged onto the paper cassette 4 by the paper discharging roller 25, such as shown by a two-dotted line in FIG. 1.

Next, an operation of the above-mentioned embodiment is described. After the color thermal printer has been operated so as to start printing, a motor which is not shown starts to rotate. The rotation of the motor is transmitted to the paper feeding roller 5 and the capstan roller 7 of the conveyor roller pair 9. As shown in FIG. 1, the paper feeding roller 5 abuts on the recording paper 2 through the opening 4a to advance the uppermost recording paper 2 of the paper cassette 4 toward the conveyance passage. At first, the pinch roller 8 of the conveyor roller pair 9 is separated from the capstan roller 7, and the platen roller 13 is moved to the paper feeding position where the platen roller 13 is separated from the thermal head 12.

The recording paper 2 advanced from the paper cassette 4 is nipped by the conveyor roller pair 9 which is also used as the paper feeding means. After that, the recording paper 2 is conveyed toward the gap formed between the thermal head 12 and the platen roller 13. As shown in FIG. 3, when the platen roller 13 is set at the paper feeding position, the support plates 15 and 16 do not push the guide member 18. Thus, the guide member 18 is moved, by the urging force of the elastic pieces 18c and 18d, to the guide position where the guide portion 18b projects into the conveyance passage. The recording paper 2 having been conveyed by the conveyor roller pair 9 abuts on the guide portion 18b of the guide member 18, and then, gets over the guide portion 18b. After that, the recording paper 2 is forwarded between the thermal head 12 and the platen roller 13 so as to come into contact with the platen roller 13. In this way, by providing the guide member 18, the leading portion of the recording paper 2 is surely prevented from being damaged. Further, failure in the conveyance of the recording paper 2 is also prevented.

When a sensor which is not shown detects that the recording paper 2 has been conveyed by a predetermined amount, the conveyor roller pair 9 stops to convey the recording paper 2. At the same time, a cam mechanism which is not shown is actuated to swing the support plates 15 and 16. The support plates 15 and 16 are rotated around the pins 15a and 16a in the clockwise direction in FIG. 3. Due to this, the platen roller 13 is moved to the printing position where the platen roller 13 is pressed against the thermal head 12, such as shown in FIG. 4. Moreover, the swung support plates 15 and 16 push the base portion 18a of the guide member 18 with its bottom portion to lower the guide member 18. The guide member 18 is moved to the evacuation position against the urging force of the elastic pieces 18c and 18d. When the guide member 18 is moved to the evacuation position and the guide portion 18b is evacuated from the conveyance passage, the platen roller 13 nips the recording paper 2 with the thermal head 12. In this way , after the guide portion 18b of the guide member 18 has been evacuated from the conveyance passage, the recording paper 2 is nipped between the platen roller 13 and the thermal head 12. Thus, the recording paper does not slacken between the conveyor roller pair 9 and the thermal head 12.

Successively, the motor is rotated in reverse to rotate the capstan roller 7 of the conveyor roller pair 9 in a reverse direction. Upon this, the recording paper 2 is conveyed in the printing direction in FIG. 4. When a leading end of a recording area of the recording paper reaches the thermal head 12, the heating element array 11 is heated to heat the recording area and to thermally record a yellow image in the yellow thermosensitive coloring layer one line by one line. Moreover, when the yellow image is thermally recorded, at the same time, the yellow ultraviolet lamp 20 is turned on to fix the yellow thermosensitive coloring layer of the recording area.

After the yellow thermosensitive coloring layer has been thermally recorded and has been fixed, the conveyance of the recording paper 2 is stopped and the platen roller 13 is moved to the paper feeding position. The guide member 18 is released from being pushed by the support plates 15 and 16 so that the guide member 18 is moved to the guide position by the urging force of the elastic pieces 18c and 18d. After that, the motor is rotated in the paper feeding direction again, and the conveyor roller pair 9 conveys the recording paper 2 in the paper feeding direction. During this conveyance, the guide member 18 abuts on the recording paper 2 so as to make it contact with the platen roller 13. Therefore, even if the recording paper is a seal-like type, it is prevented from being peeled by contacting with the thermal head 12.

After the recording paper 2 has been conveyed in the paper feeding direction, the platen roller 13 is moved to the printing position to nip the recording paper 2 with the thermal head 12. Moreover, the guide member 18 is moved to the evacuation position so that the guide portion 18b is released from abutting on the recording paper 2. The motor is rotated in the printing direction again and the conveyor roller pair 9 conveys the recording paper 2 in the printing direction. When the leading end of the recording area of the recording paper 2 reaches the thermal head 12, the heating element array 11 starts to apply the heat. Upon this, the magenta image is thermally recorded in the magenta thermosensitive coloring layer one line by one line. Moreover, when the magenta image is thermally recorded, at the same time, the magenta ultraviolet lamp 21 is turned on to fix the magenta thermosensitive coloring layer of the recording area.

After the magenta thermosensitive coloring layer has been thermally recorded and has been fixed, the platen roller 13 is moved to the paper feeding position, and the guide member 18 is moved to the guide position. Further, the recording paper 18 is conveyed in the paper feeding direction. When the recording paper 2 has been conveyed by the predetermined amount, the guide member 18 is moved to the evacuation position, and the platen roller 13 is moved to the printing position. Successively, the recording paper 2 is started to be conveyed in the printing direction. When the leading end of the recording area of the recording paper 2 reaches the thermal head 12, the heating element array 11 starts to apply the heat. Upon this, the cyan image is thermally recorded in the cyan thermosensitive coloring layer one line by one line.

After the cyan thermosensitive coloring layer has been thermally recorded, the recording paper 2 reaches the paper discharging roller 25 along the paper guide 24. The cyan thermosensitive coloring layer is not colored in a normal state so that the optical fixation is not performed for the cyan thermosensitive coloring layer. The recording paper 2 is discharged by the paper discharging roller 25 onto the paper cassette 4 being as the paper tray.

In the above-described embodiment, the guide member 18 having a plate-like shape is used. However, the guide member may have a roller-like shape. Hereinafter, referring to FIGS. 5 and 6, another embodiment is described. In this embodiment, a roller-shaped guide member is used. Incidentally, with respect to a member being identical with that of the above embodiment, same reference numeral is used and a detailed description is omitted.

Figure 5:
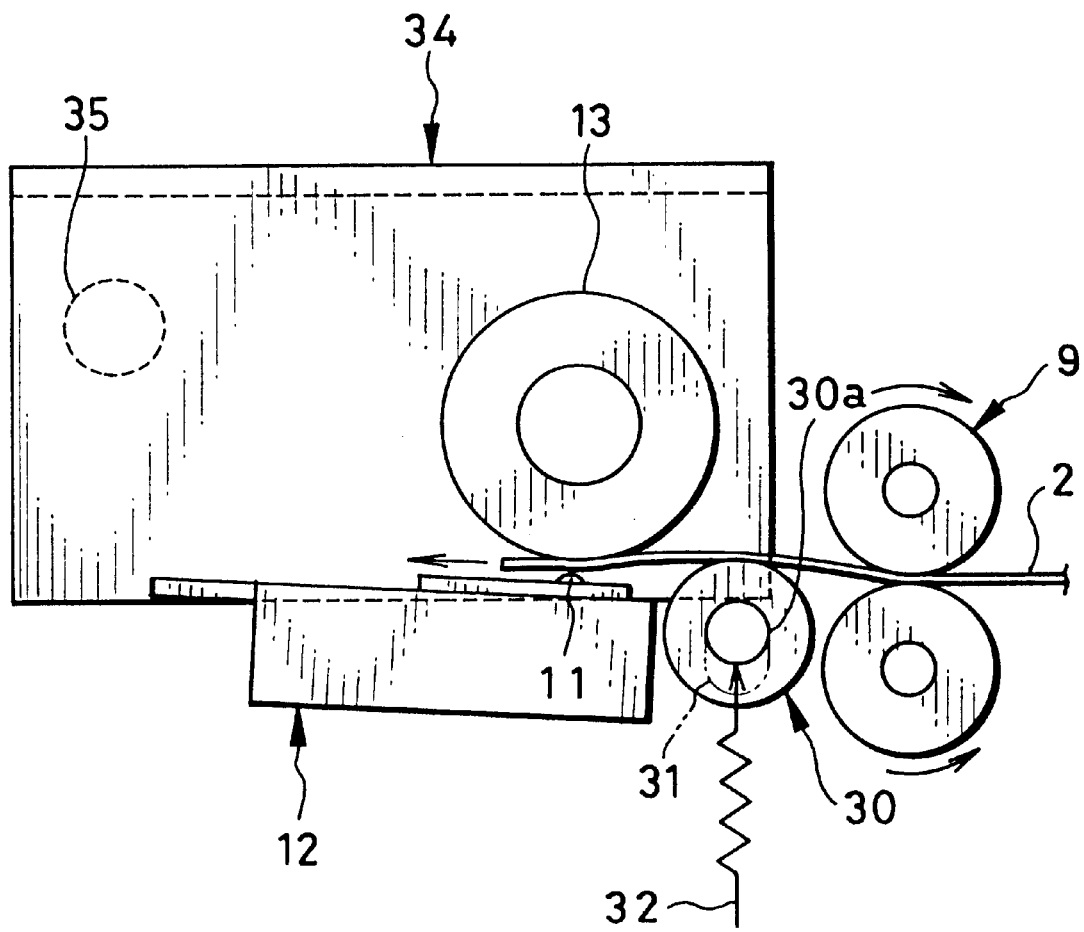
FIG. 5 is an explanatory illustration showing a state of a guide roller at the time of paper feeding.

As shown in FIG. 5, a guide roller 30 is used as the roller-shaped guide member. A shaft 30a provided at each end of the guide roller 30 is movably contained in an ellipse hole 31 formed in a vertical direction. The guide roller 30 is urged by a spring 32 toward a guide position being an upper position. When a platen roller 13 is set at a paper feeding position, the guide roller 30 is moved to the guide position by urging force of the spring 32. In this state, a color thermosensitive recording paper 2 is conveyed by a conveyor roller pair 9 in a paper feeding direction, and is guided to a gap formed between the thermal head 12 and the platen roller 13.

Figure 6:
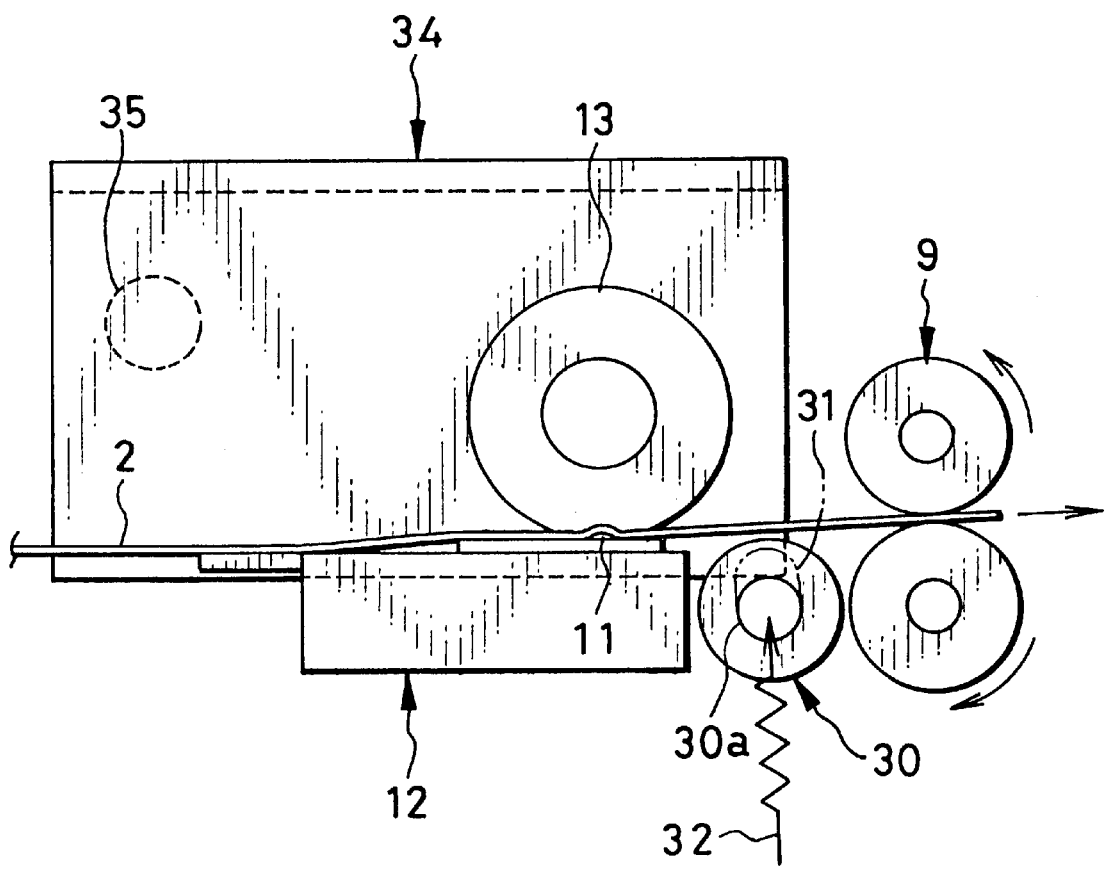
FIG. 6 is an explanatory illustration showing a state of the guide roller at the time of printing.

As shown in FIG. 6, when a support plate 34 rotated around pin 35 is swung to move the platen roller 13 to a printing position, the shaft 30a is pushed by a bottom of the support plate 34. Upon this, the guide roller 30 is moved to a lower evacuation position against the urging force of the spring 32. Thus, the guide roller 30 does not make the quality of printing worse. By using the roller-shaped guide member, it is possible to obtain the effect being equal to that of the first embodiment.

In the above embodiments, the color thermal printer reciprocates the recording paper to thermally record a color image. However, the present invention is applicable to a color thermal printer in which a plurality of thermal heads and platen rollers are provided to thermally record a color image during one-way conveyance of the recording paper. Moreover, in the above embodiment, the printer uses the sheet-like recording paper. However, the present invention is applicable to a color thermal printer in which a strip-like recording paper is used. This recording paper is wound in a roll form and is cut as required.

Further, in the above embodiments, the color thermal printer is used. However, the present invention is applicable to heat transfer printers of sublimate type and thermally melting type. These heat transfer printers use color-ink sheets of yellow, magenta and cyan. In this case, an optical fixing unit is not necessary. Furthermore, the present invention is applicable to monochrome printers of thermosensitive type, sublimate type, and thermally melting type.

In the above embodiments, when the recording paper is nipped with the platen roller and the thermal head, the platen roller is moved toward the thermal head. However, the thermal head may be moved toward the platen roller to nip the recording paper. In this case, the guide member is moved in association with the movement of the thermal head.

As sated above, the thermal printer according to the present invention is provided with the guide member which guides the recording paper at the time of paper feeding and which is evacuated at the time of recording. Thus, the recording paper is properly forwarded between the thermal head and the platen without damaging the leading edge of he recording paper. Moreover, jamming and failure in conveyance are prevented from occurring.

The guide member is moved in association with the operations in that the recording paper is nipped with the thermal head and the platen, and in that the recording paper is released from being nipped. Thus, it is possible to simplify the structure, and it is also possible to lower the cost and a ratio of failure occurrence.

The guide member has a plate-like shape and is integrally formed with the spring by using the plastic having elasticity. Thus, a number of parts is reduced so that the cost can be lowered.

Otherwise, in the case that the guide member uses a rotatable roller, conveying resistance of the recording paper can be reduced.

Nipping the recording paper with the thermal head and the platen is performed after the guide member has been moved to the evacuation position. Thus, the recording paper is prevented from slackening.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A thermal printer in which thermal recording is preformed for a recording paper comprising:

a thermal head disposed along a conveyance passage of said recording paper;

a platen facing said thermal head and disposed so as to catch said conveyance passage with said thermal head;

a paper feeder for forwarding said recording paper between said thermal head and said platen; and a rigid guide member, integrally formed with a spring leg by using a plastic to bias the guide member, said guide member being disposed between said thermal head and said paper feeder, said guide member being movable between a guide position where said guide member projects into said conveyance passage, and an evacuation position where said guide member is evacuated from said conveyance passage, when said recording paper is fed between said thermal head and said platen, said guide member is set at said guide position to guide said recording paper, and when said recording paper is nipped with said thermal head and said platen, said guide member is set at said evacuation position.

2. A thermal printer according to claim 1, wherein said guide member is moved between said evacuation position and said guide position in association with operations in that said recording paper is nipped with said thermal head and said platen, and in that said recording paper is released from being nipped.

3. A thermal printer according to claim 2, wherein said guide member is urged by said spring leg toward said guide position, when said recording paper is nipped by said thermal head and said platen, said guide member being pushed to be moved to said evacuation position against an urging force of said spring leg, and when said recording paper is released from being nipped, said guide member being released and moved to said guide position by the urging force of said spring leg.

4. A thermal printer according to claim 3, wherein said guide member has a thin planar shape and shifts vertically.

5. A thermal printer according to claim 1, wherein said guide member is provided with a guide portion having a slope, said guide portion abutting on said recording paper.

6. A thermal printer according to claim 5, further comprising support plates for supporting both ends of said platen, said platen being moved to be pressed against said thermal head by swinging said support plates.

7. A thermal printer according to claim 6, wherein a bottom of said support plates pushes a top of said guide member to move said guide member towards said evacuation position when said platen is pressed against said thermal head by swinging said support plates.

8. A thermal printer in which thermal recording is performed for a recording paper comprising:

a thermal head disposed along a conveyance passage of said recording paper;

a platen facing said thermal head and disposed so as to catch said conveyance passage with said thermal head;

a paper feeder for forwarding said recording paper between said thermal head and said platen; and a rotatable roller, disposed between said thermal head and said paper feeder, said rotatable roller being movable between a guide position where said rotatable roller projects into said conveyance passage, and an evacuation position where said rotatable roller is evacuated from said conveyance passage, when said recording paper is being fed between said thermal head and said platen, said rotatable roller is set at said guide position to guide said recording paper, and when said recording paper is being nipped with said thermal head and said platen, said rotatable roller is set at said evacuation position.

9. A thermal printer according to claim 8, wherein both ends of said roller are respectively provided with a shaft engaging with an ellipse hole formed in a vertical direction.

10. A thermal printer according to claim 9, further comprising support plates for supporting said platen, said platen being pressed against said thermal head by swinging said support plates, at this time, a bottom of said support plates pushing said shaft of said roller along said ellipse hole to move said roller toward said evacuation position.

11. A thermal printer according to claim 8, wherein said roller is moved between said evacuation position and said guide position in association with operations in that said recording paper is nipped with said thermal head and said platen, and in that said recording paper is released from being nipped.

12. A thermal printer according to claim 11, wherein said roller is urged by a spring toward said guide position, when said recording paper is nipped by said thermal head and said platen, said roller being pushed to be moved to said evacuation position against an urging force of said spring, and when said recording paper is released from being nipped, said guide member being released and moved to said guide position by the urging force of said spring.

13. A thermal printer according to claim 12, wherein nipping said recording paper with said thermal head and said platen is performed after said guide member has moved to said evacuation position.

* * * * *